United States Patent
Lovell et al.

(10) Patent No.: US 12,362,411 B2
(45) Date of Patent: Jul. 15, 2025

(54) BATTERY ASSEMBLY

(71) Applicant: Hyperdrive Innovation Limited, Sunderland Tyne and Wear (GB)

(72) Inventors: Jason Lovell, Sunderland Tyne and Wear (GB); Andrew Walt, Sunderland Tyne and Wear (GB)

(73) Assignee: Hyperdrive Innovation Limited, Sunderland (GB)

( * ) Notice: Subject to any disclaimer, the term of this patent is extended or adjusted under 35 U.S.C. 154(b) by 706 days.

(21) Appl. No.: 17/778,399

(22) PCT Filed: Nov. 20, 2020

(86) PCT No.: PCT/GB2020/052976
§ 371 (c)(1),
(2) Date: May 19, 2022

(87) PCT Pub. No.: WO2021/099804
PCT Pub. Date: May 27, 2021

(65) Prior Publication Data
US 2023/0026779 A1     Jan. 26, 2023

(30) Foreign Application Priority Data
Nov. 20, 2019   (GB) ...................... 1916903

(51) Int. Cl.
*H01M 10/647*     (2014.01)
*H01M 10/6552*    (2014.01)
(Continued)

(52) U.S. Cl.
CPC ..... *H01M 10/647* (2015.04); *H01M 10/6552* (2015.04); *H01M 10/6555* (2015.04); *H01M 50/211* (2021.01); *H01M 2220/20* (2013.01)

(58) Field of Classification Search
CPC ........... H01M 10/647; H01M 10/6552; H01M 10/6555; H01M 50/211; H01M 2220/20
(Continued)

(56) References Cited

U.S. PATENT DOCUMENTS

| 2008/0090137 A1 | 4/2008 | Buck et al. |
| 2012/0288741 A1 | 11/2012 | Gutsch et al. |
| 2014/0113171 A1 | 4/2014 | Schaefer |

(Continued)

FOREIGN PATENT DOCUMENTS

| CN | 103199315 A | 7/2013 |
| CN | 207441819 U | 6/2018 |

(Continued)

OTHER PUBLICATIONS

International Searching Authority, Written Opinion of the International Searching Authority for PCT/GB2020/052976 (May 27, 2021).
UK Examination Report for Application GB1916903.6, UKIPO, Dec. 18, 2020.
(Continued)

*Primary Examiner* — James M Erwin
(74) *Attorney, Agent, or Firm* — Temmerman Law; Mathew J. Temmerman

(57) ABSTRACT

A battery assembly comprising: a first pouch cell for a battery, comprising a flexible surface to allow expansion and contraction of the first pouch cell a cooling plate having: a cell contact area for providing thermal contact between the cooling plate and the flexible surface of the first pouch cell; and an exchange contact area for providing thermal contact with a heat exchanger; a resilient interposer arranged to hold the cell contact area in thermal contact with the flexible surface of the first pouch cell in the event of expansion and/or contraction of the first pouch cell.

3 Claims, 5 Drawing Sheets

(51) Int. Cl.
*H01M 10/6555* (2014.01)
*H01M 50/211* (2021.01)

(58) Field of Classification Search
USPC .......................................... 429/62
See application file for complete search history.

(56) References Cited

U.S. PATENT DOCUMENTS

2015/0118537 A1* 4/2015 Obasih ............... H01M 50/209
429/120
2018/0219261 A1* 8/2018 Drews ............... H01M 10/0525
2019/0097284 A1 3/2019 Ishiguro

FOREIGN PATENT DOCUMENTS

| | | |
|---|---|---|
| CN | 108336452 A | 7/2018 |
| DE | 102012224330 A1 | 4/2014 |
| EP | 2833434 A1 | 2/2013 |
| JP | 2012248374 A | 1/2012 |
| WO | 2013025595 A1 | 2/2013 |
| WO | 2014103592 A1 | 7/2014 |
| WO | 2018022907 A1 | 2/2018 |
| WO | 2019167689 A1 | 9/2019 |

OTHER PUBLICATIONS

UK Examination Report for Application GB1916903.6, UKIPO, Jun. 30, 2021.
UK Examination Report for Application GB2018312.5, UKIPO, Dec. 18, 2020.

* cited by examiner

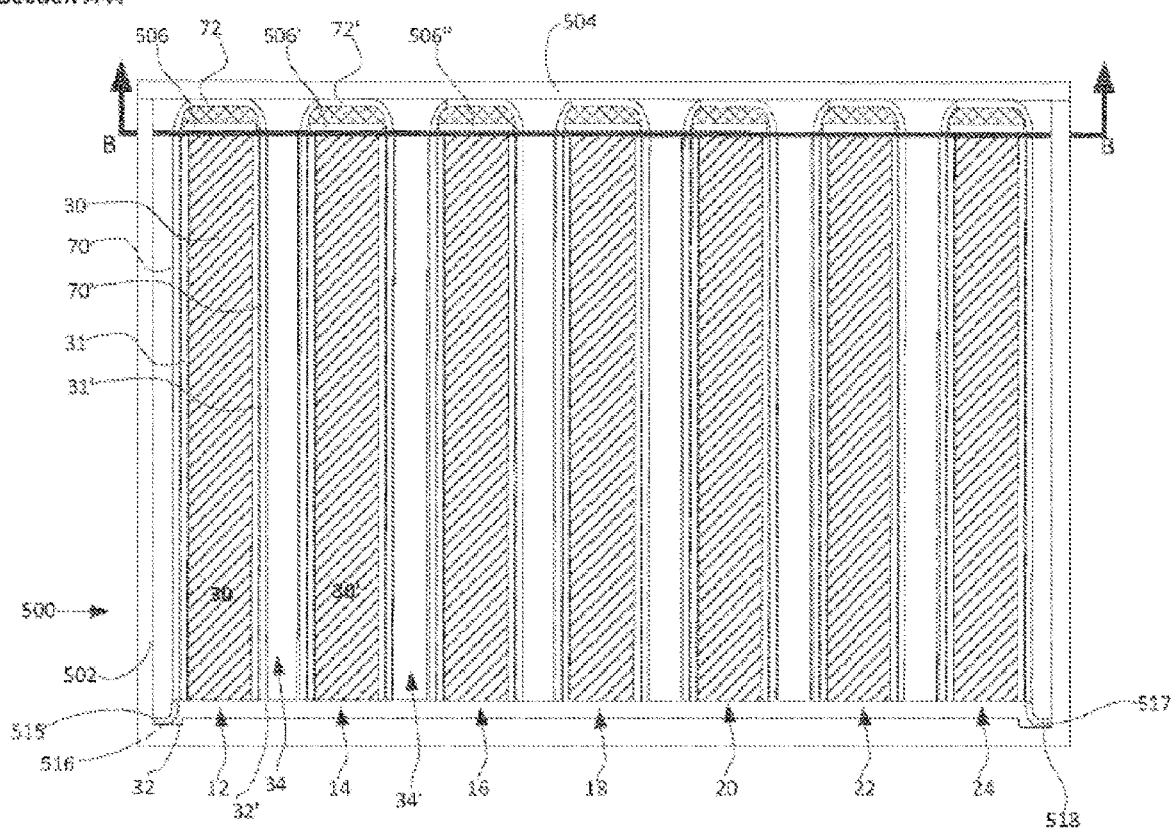
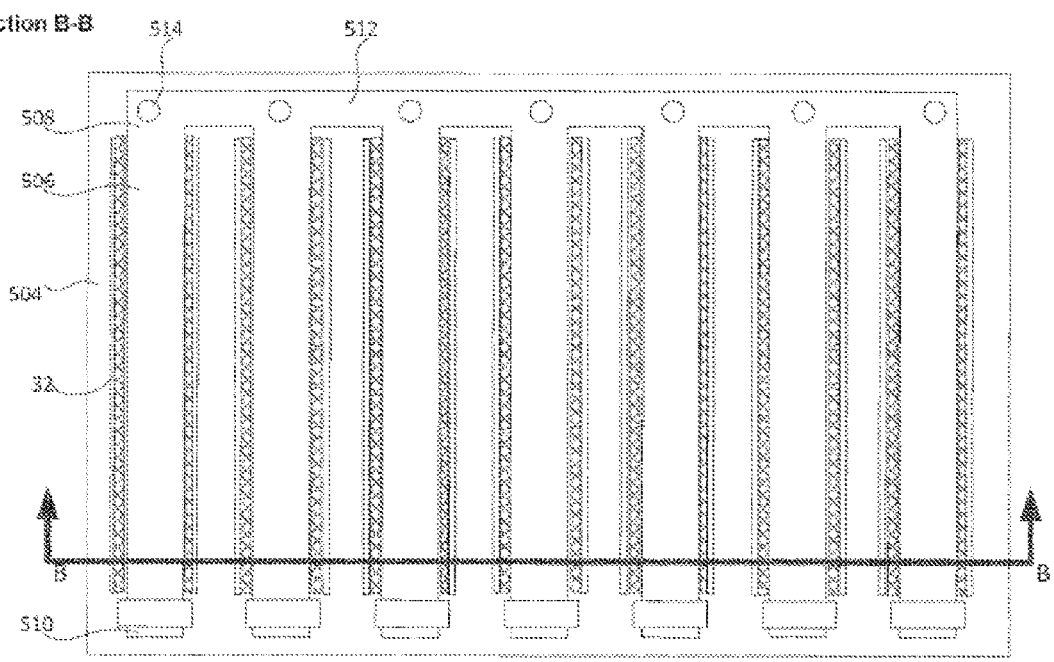
Figure 5

BATTERY ASSEMBLY

RELATED APPLICATIONS

This application is a 35 U.S.C. 371 National Stage Entry of International Application No. PCT/GB2020/052976, filed Nov. 20, 2020, and claims the benefit of United Kingdom Application 1916903.6, filed Nov. 20, 2019, each of which is incorporated herein by reference in its entirety for all purposes as if fully set forth herein.

FIELD OF INVENTION

The present invention relates to methods and apparatus, and more particularly to batteries and assemblies for batteries, and to methods of manufacture thereof, still more particularly the invention relates to batteries for electric vehicles and electric plant equipment.

BACKGROUND

In the past, most electric vehicles have used lead-acid batteries. The technology is mature, they are easily available and the cost is low. Some Electric Vehicles have used a nickel-iron battery. Deep-cycle lead batteries are expensive and have a shorter life than the vehicle itself, typically needing replacement every 3 years. Lead-acid batteries are heavy, and are a significant contributor to total vehicle mass. Like all batteries, they have significantly lower specific energy than petroleum fuels. This is somewhat offset because the drive train in an electric vehicle can be very much lighter than in a vehicle powered by an internal combustion engine. Nevertheless, the energy density and efficiency of batteries for electric vehicles and plant equipment represents a significant technical issue.

Lithium ion batteries are growing in popularity. They have a high energy density, and less memory effect than many types of batteries. If damaged or incorrectly charged, the electrolyte they contain can be hazardous. In extreme cases of damage, misuse, or overheating, they have been associated with fires and even explosions.

To address these problems, commercial manufacturers of battery cells have provided encapsulation which aims to protect the cells from such damage, and to facilitate cooling. One particularly successful and popular example is the battery module which is used in the Nissan Leaf (RTM). The battery in the Nissan Leaf is manufactured and assembled by the Automotive Energy Supply Corporation (AESC), a joint venture corporation between Nissan and NEC. The battery pack in the Nissan Leaf is assembled from a set of individual modules.

Each individual module comprises four individual pouch cells, also known as laminate cells, encapsulated in a relatively rigid metal enclosure, which serves to protect the cells and to allow heat to be conducted away for cooling. The modular encapsulation serves to provide excellent safety and heat management characteristics.

Embodiments of the present disclosure aim to further improve upon such systems.

SUMMARY

Aspects and embodiments of the present invention are set out in the claims and aim to provide improved thermal management in batteries which are made from pouch cells. Despite the many advantages construction using pouch cells might provide, the cells may swell during use as a result of gas discharge from the cell components (such as the electrolyte, cathode and/or anode). Pouches may also expand and contract due to changes in temperature. Embodiments of the present disclosure aim to provide improved thermal contact and robust encapsulation in these circumstances.

Embodiments of the disclosure provide a battery assembly, such as a unit from which a battery can be assembled—e.g. by using one or more such assemblies. Batteries of larger or smaller size may be manufactured by using a larger or smaller number of such assemblies.

In an aspect there is provided a battery assembly comprising: a first pouch cell comprising a flexible surface to allow expansion and contraction of the first pouch cell, and a cooling plate having: (i) a cell contact area for providing thermal contact between the cooling plate and the flexible surface of the first pouch cell; and (ii) an exchange contact area for providing thermal contact with a heat exchanger. A resilient interposer is arranged to hold the cell contact area in thermal contact with the flexible surface of the first pouch cell in the event of expansion and/or contraction of the first pouch cell.

In an aspect there is provided a battery assembly comprising: a first pouch cell comprising a flexible surface to allow expansion and contraction of the first pouch cell, and a cooling plate having: (i) a cell contact area for providing thermal contact between the cooling plate and the flexible surface of the first pouch cell; and (ii) an exchange contact area for providing thermal contact with a heat exchanger; wherein the cooling plate is arranged so that the cell contact area can slide along (e.g. laterally with respect to) the flexible surface while maintaining thermal contact with the flexible surface.

In an aspect there is provided a battery assembly comprising: a plurality of pouch cells, each comprising a flexible surface to allow expansion and contraction of the pouch cells; a heat exchange panel, for securing to a holder to enclose the battery assembly; a plurality of cooling plates each having: a cell contact area for providing thermal contact with the flexible surface; and an exchange contact area transverse to the cell contact area and configured for providing thermal contact with the heat exchange panel; wherein each cooling plate is arranged so its cell contact area is in thermal contact with the flexible surface of a respective corresponding one of the plurality of pouch cells; the battery assembly further comprising a plurality of securement bars, each bar holding the exchange contact area of a corresponding one of the plurality of cooling plates to the heat exchange panel.

Each of the above aspects may be implemented in a variety of ways. For example pouch cell may be made up of two flat sheets, which provide this flexible surface of the cell. These sheets may be rectangular, and bonded together along three edges to form a pouch which contains the electrolyte, anode and cathode. This construction is particularly beneficial because it is lightweight and permits good thermal contact with the electrolyte via the sheets which provide the walls of the pouch cells. These sheets may each comprise one or more layers of polymeric material, and are generally flexible. Typically the pouch cells are flat, having two major surfaces which are much larger in width and breadth than the thickness of the pouch.

The cooling plate may be arranged so that the cell contact area can slide with respect to the flexible surface while maintaining thermal contact with the flexible surface. For example a resilient interposer may be arranged to hold the cell contact area in thermal contact with the flexible surface of the first pouch cell. This thermal contact may be mediated by a first skin plate between the cell contact area and the flexible surface of the first pouch cell. The skin plate may be separate from the pouch cell and arranged so that it is able to move reversibly towards and away from the pouch cell. Typically the skin plate comprises a thermally conductive material such as metal. A single skin plate may be provided, or one skin plate may be provided on each face of the pouch cell.

The resilient interposer may be arranged to bias the cell contact area against the first skin plate. For example, when a stack of the battery assemblies is held together in a battery, the resilient interposer may accommodate longitudinal expansion and contraction (e.g. changes in the thickness of the pouch cell) whilst maintaining thermal contact.

A holder may be provided for holding the pouch cells, and a heat exchange panel may be securable to the holder to enclose the pouch cells. Embodiments may comprise a heat exchange panel for this purpose and the heat exchange panel may comprise cooling means such as fluid chambers which may comprise liquids, vapours and other cooling means. The heat exchange panel and holder may be arranged so that when the heat exchange panel is secured to the holder to enclose the pouch cells, the heat exchange panel and the exchange contact area of the first cooling plate are urged against each other. For example, a resilient mounting may be arranged so that the cooling plate is resiliently displaced by securing the heat exchange plate to the enclosure. The resilient mounting can thus provide a reaction force which biases the exchange contact area against the heat exchange panel to assist thermal contact between the two. The resilient mounting is optional and other arrangements can be used instead. For example a securement bar may be fixed to the heat exchange panel, and the (e.g. interdigitated) exchange contact areas of two adjacent cooling plates may be sandwiched between the securement bar and the heat exchange panel. This may assist in holding the exchange contact areas in thermal contact with the heat exchange panel.

Where a resilient mounting is used, the cooling plate may be coupled to the holder by the resilient mounting. For example it may be disposed in a space between the exchange contact area and an edge of the pouch cell, which may in turn be fixed to the holder. Other arrangements can also be used.

The battery assembly may comprise a second cooling plate also having a cell contact area and an exchange contact area, wherein the pouch cell is disposed between the cell contact area of the second cooling plate and the cell contact area of the first cooling plate.

A second skin plate may be disposed between the pouch cell and the cell contact area of the second cooling plate. A second pouch cell may also be provided (e.g. in an adjacent battery assembly) and the resilient interposer may be arranged between the second pouch cell and the first cooling plate. In such a configuration the adjacent battery assembly may comprise a third cooling plate, wherein the third cooling plate is disposed between the resilient interposer and the second pouch cell. A third skin plate may be provided between a cell contact area of the third cooling plate and the flexible surface of the second pouch cell.

The first cooling plate may comprise a recess, such as a channel, for holding a heat pipe. A heat pipe may be disposed in said recess, and arranged to conduct heat preferentially in a longitudinal direction across the surface of the cooling plate towards the exchange contact area of the cooling plate. The channel may be oriented away from the terminals of the pouch cell. For example, the channel may be straight and the end of the channel may be on a different edge of the pouch cell from the terminals.

A plurality of said pouch cells may be provided, and a plurality of said cooling plates may be interleaved between the pouch cells, each being separated from and thermally connected to a corresponding adjacent one of the pouch cells by a thermally conductive skin plate.

Each cooling plate may be arranged so its cell contact area is in thermal contact with the flexible surface of a respective corresponding one of the plurality of pouch cells for cooling said respective corresponding pouch cell. This thermal contact may be mediated by a skin plate, or the cooling plate may abut the flexible surface of the pouch cell or the pouch cell unit.

An aspect provides a battery assembly comprising:
a plurality of pouch cells, each comprising a flexible surface to allow expansion and contraction of the pouch cells;
a plurality of cooling plates each having:
a cell contact area for providing thermal contact with the flexible surface; and
an exchange contact area for providing thermal contact with a heat exchanger;
wherein each cooling plate is arranged so its cell contact area is in thermal contact with the flexible surface of a respective corresponding one of the plurality of pouch cells for cooling said respective corresponding pouch cell.

A resilient interposer may be arranged to allow resilient movement of at least one of the cooling plates in response to expansion and/or contraction of the pouch cells.

The assembly may comprise a plurality of thermally conductive skin plates interleaved between the pouch cells and the cooling plates such that the plurality of cooling plates are each separated from and thermally connected to a corresponding adjacent one of the pouch cells by a respective corresponding one of the thermally conductive skin plates.

The pouch cells may be provided in a unit, which may comprise one or more such cells. The cells may be connected together electrically, and the embodiments referred to above may each use such a unit in place of the pouch cell. Such a unit, or the pouch cells themselves may comprise at least one through-hole, and an elongate member can be disposed through the through-hole to link a set of battery assemblies together in a stack.

The elongate member may be rigid, and may comprise a rod. The elongate member may have a cross section which matches a cross section of the through-holes in the cells or cell units to fix the lateral position of the pouch cells while allowing longitudinal movement (e.g. along the rods).

The plurality of thermally conductive skin plates may each have a through-hole having a cross section which matches a cross section of the through-hole of the pouch cells to fix the lateral position of the thermally conductive skin plates while allowing longitudinal movement.

To hold the units of the assembly (pouch cell, cooling plates, and optional skin plates) in position in the holder securement bars may be affixed to the heat exchange panel. The (e.g. interdigitated) exchange contact areas of the two cooling plates of each unit may be sandwiched between the securement bar and the heat exchange panel. This may assist in holding the exchange contact areas in thermal contact with the heat exchange panel. A plurality of securement bars may be used, and these may all be joined together at one of their ends by a spine, so the securement bars and spine together provide a comb plate.

The heat exchange panel may provide a lid of the holder and the lid and the securement bars together may support the battery assembly in the holder. For example, they may hold it suspended in the holder. It may additionally be supported by feet. The securement bars may be joined together by a spine disposed along the ends of the plurality of pouch cells to provide a flat comb shaped panel, which may be affixed parallel to the heat exchange panel. The plurality of cooling plates may comprise a plurality of pairs of said cooling plates, one for each securement bar, and the respective exchange contact areas of each pair of plates may complementarily fit together between the heat exchange panel and the corresponding securement bar.

Each pouch cell may be-disposed between one of said pairs of cooling plates. A resilient interposer may be arranged to hold the cell contact area in thermal contact with the flexible surface of the first pouch cell in the event of expansion and/or contraction of the first pouch cell. The cooling plate may be arranged so that the cell contact area can slide with respect to the flexible surface while maintaining thermal contact with the flexible surface.

A first skin plate may be provided between the cell contact area and the flexible surface of the first pouch cell, wherein the first skin plate is thermally conductive.

As in other embodiments described herein a resilient interposer may be arranged to bias the cell contact area against the first skin plate. For example, the resilient interposer may be disposed between adjacent units of the assembly, so that the cooling plate of one unit is separated from the cooling plate of the next by a resilient interposer. Thus, as in the other embodiments described herein, in the event of lateral expansion of the pouch cells (e.g. expansion in a direction normal to the major surface of the pouch cell) the resilient interposer can be compressed by the lateral movement of the adjacent cooling plates between which it is disposed. In the event of thermal contraction of the pouch cells, the interposer resiliently expands (e.g. returns to its size prior to compression) to hold the cooling plates in thermal contact with their corresponding pouch cells. The resilient interposer can thus be arranged between two adjacent pouch cells to accommodate relative lateral thermal expansion and contraction of said two adjacent pouch cells whilst holding the corresponding cooling plates in thermal contact with their corresponding pouch cells.

The cooling plates may comprise a recess for holding a heat pipe. In some embodiments a heat pipe is included and disposed in said recess.

Any feature of any one of the examples disclosed herein may be combined with any selected features of any of the other examples described herein. For example, features of methods may be implemented in suitably configured hardware, and the configuration of the specific hardware described herein may be employed in methods implemented using other hardware.

BRIEF DESCRIPTION OF DRAWINGS

Embodiments of the disclosure will now be described in detail with reference to the accompanying drawings, in which:

FIG. 5 shows two section views of another battery.

In the drawings like reference numerals are used to indicate like elements.

SPECIFIC DESCRIPTION

Figure 1:
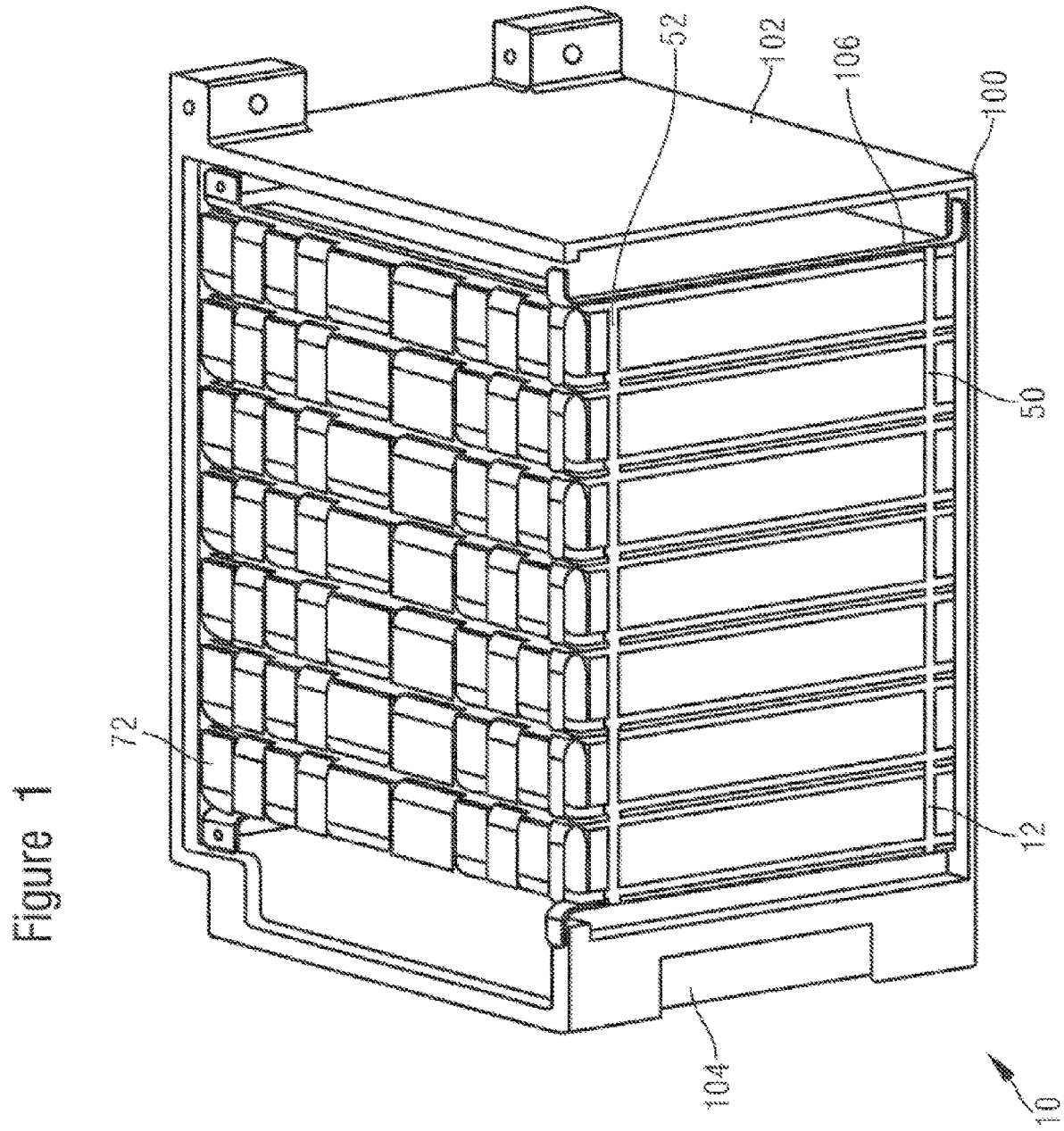
FIG. 1 shows an elevation of a part cut away view of a battery comprising a plurality of unit assemblies.
Figure 2:
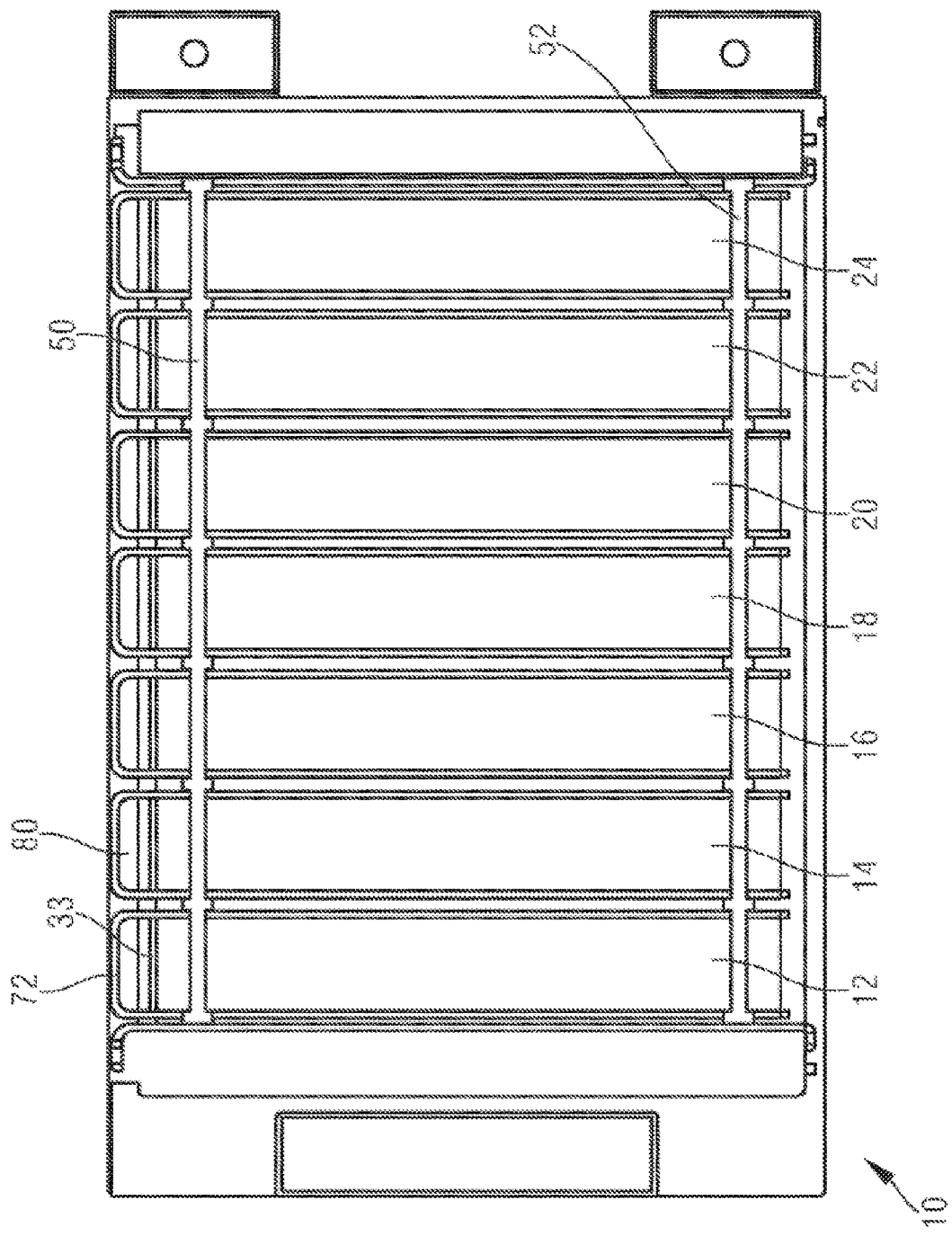
FIG. 2 shows a section through the battery of FIG. 1.
Figure 3:
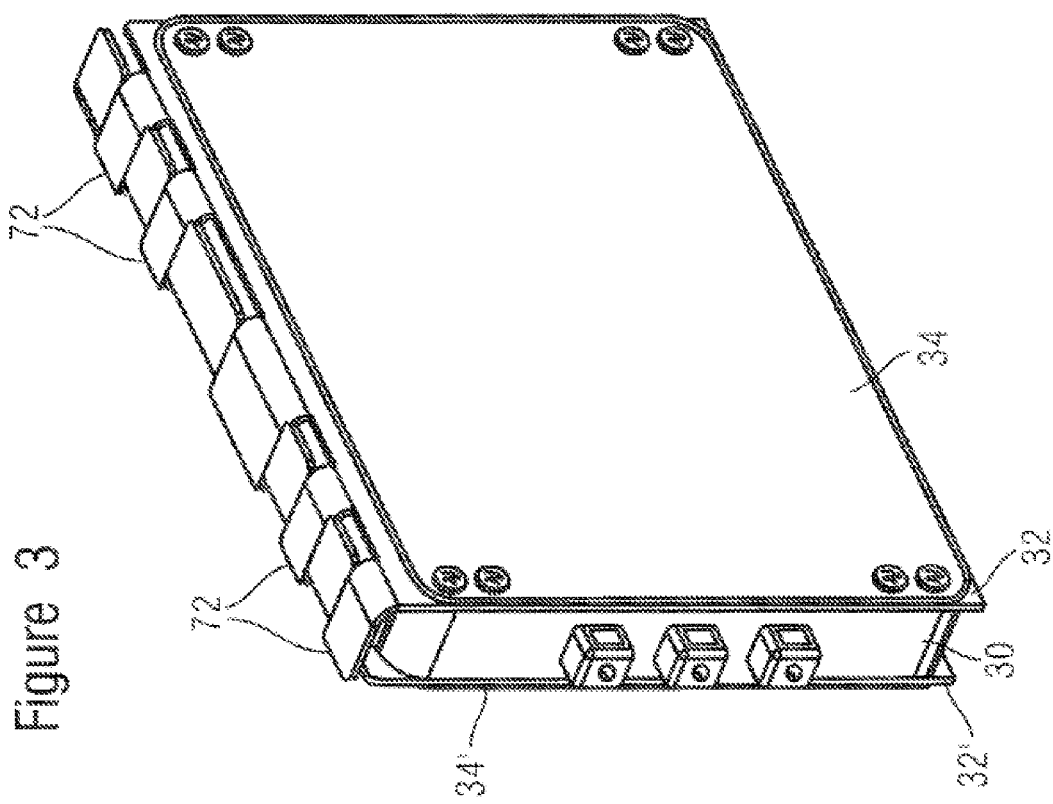
FIG. 3 shows a battery assembly for providing the battery of FIG. 1 and FIG. 2.

FIGS. 1 and 2 show a battery 10 which comprises a plurality of assemblies 12, 14, 16, 18, 20, 22, 24. The assemblies 12-24 are made up of pouch cell units 30, skin plates 31, 31', cooling plates 32, 32', and may comprise resilient interposers such as slabs of foam 34, 34'.

Figure 4:
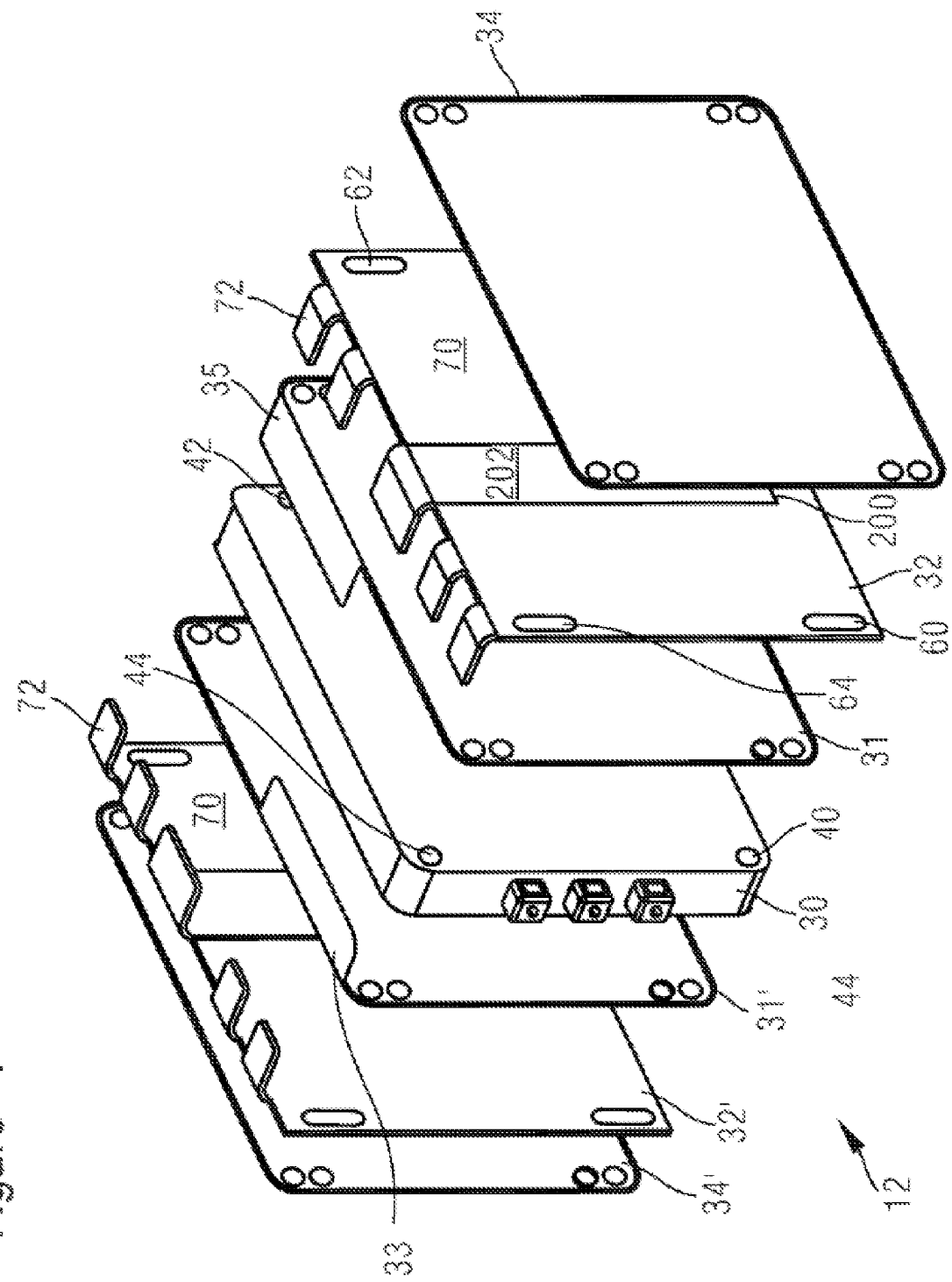
FIG. 4 shows an exploded view of the battery assembly illustrated in FIG. 3.

As shown in FIG. 4, each pouch cell unit 30 may comprise four through-holes 40, 42, 44, one at each corner to allow the units to be mounted together on a set of four rods 50, 52 by threading one rod through each of the four through-holes.

Each pouch cell unit 30 may be sandwiched between two skin plates 31, 31'. Each skin plate 31, 31' is typically rigid, and flat, and thermally conductive. The major surfaces of the skin plates 30 are arranged laterally (transverse to the rods 50, 52). They may also comprise a longitudinal portion 33, 35 (e.g. aligned with the rods) at one edge of the skin plate, so that the longitudinal portion 33, 35 covers part of the edge of the pouch cell unit. The longitudinal portions 33, 35 of the two skin plates 31, 31' may be complementary in the sense that each may cover part of the edge of the pouch cell unit, so that the two fit together to protect the entire length of one edge of the unit 30. The skin plate 30 may comprise a metal. The skin plate 31 may also have through holes, which may be the same size and shape as the through holes 40, 42, 44 in the pouch cell units, and arranged for mutual alignment with those through holes so that the rods 50, 52 can be threaded through the pouch cell unit 30 and the skin plate 31.

The skin plates 31, 31' are separate from the pouch cell unit 30. Thus when the skin plates 31, 31' and the pouch cell unit 30 are threaded onto the rods 50, 52, the skin plates 31, 31' can slide longitudinally along the rods 50, 52 towards and away from the adjacent pouch cell unit 30. The through-holes of the skin plates and pouch cells however may constrain lateral motion of the skin plate (e.g. motion transverse to the rods 50, 52) relative to the pouch cell unit 30. For example, the cross section of the through holes may match (e.g. fit) that of the rods 50, 52.

This arrangement of pouch cell unit 30 and skin plates 31, 31' is bounded on either side by two cooling plates 32, 32'. The cooling plates 32, 32' may comprise thermally conductive material such as a metal, for example aluminium or copper. The cooling plates 32, 32' may also comprise through holes 60, 62, 64 to allow them to be threaded onto the rods 50, 52 so as to permit longitudinal movement of the cooling plates 32, 32' along the rods 50, 52, towards and away from the pouch cell units 30. Thus, a stack can be formed of a set of these assemblies 12-24 held laterally with respect to each other by the rods 50, 52 but able to move independently from each other longitudinally along the rods 50, 52.

The cooling plates each comprise a cell contact area 70, which may be flat and arranged in a lateral plane (e.g. at a right angle to the rod(s) 50, 52 which hold the stack together). This cell contact area 70 can abut the lateral part of the pouch cell unit 30 (if a skin plate is not used) or the lateral part of the skin plate 31 to provide thermal contact between the cooling plate 32 and the pouch cell unit 30—e.g. via the skin plate 31. The cooling plates 32, 32' also comprise an exchange contact area 72, which protrudes out from the stack 12-24. In the example shown in FIG. 1, this exchange contact area 72 is arranged longitudinally (e.g. aligned with the rods, e.g. at a right-angle to the cell contact area 70). The exchange contact areas 72 of the cooling plates 32, 32' may comprise a set of tabs spaced apart along one edge of the cell contact area. These tabs may be arranged so that when the cell unit 30 is sandwiched between them, these tabs are interdigitated along the edge of the cell unit 30, e.g. over the longitudinal portions of the skin plates.

The interdigitated arrangement of these tabs may enable the cooling plates to provide an exchange contact area which covers a substantial part of the edge of the stack. Thus when the assemblies of cell unit, skin plate, and cooling plate are held together in a stack, a heat exchange panel can be coupled to the interdigitated exchange contact areas to provide a large thermal contact area to promote efficient heat exchange. In addition, the provision of this interdigitated arrangement may allow good, and evenly spatially distribution of thermal contact between the cell unit 30 and the heat exchange panel (not shown), in the event that the cell unit 30 expands longitudinally.

It can thus be seen that the cooling plates 32, 32' are also separate from the pouch cell unit 30 to allow relative movement between the cooling plates 32, 32' and pouch cell unit 30. Unlike the skin plates 31, 31', the through holes in the cooling plates 60, 62, 64, may be shaped to allow transverse movement of the cooling plates relative to the pouch cell unit 30. This can enable the cell contact area 70 of the cooling plate 32 to slide laterally (e.g. across the skin plate) while maintaining thermal contact with the flexible surface of the pouch cell via the skin plate 31. This can provide a system which is simpler to assemble and more mechanically robust in use because thermal contact between cooling plate 32, 32' and a heat exchange panel can be provided more simply and can be maintained in the event of relative movement of the heat exchanger relative to the cell units, without compromising thermal contact between cooling plates 32, 32' and the pouch cell units 30. In addition, the presence of the skin plates 31, interposed between cooling plate and pouch cell 30, may improve safety and avoid wear or puncture of the pouch cell wall without the need for rigid encapsulation of the pouch cell unit as a whole.

Thus, it can be seen that a battery 10 can be constructed by threading a set of these battery assemblies 12-24 onto a rod or set of rods 50, 52 which hold the battery assemblies together 12-24.

A resilient interposer 34 such as a slab of resilient material such as a foam, e.g. polymeric foam may be provided adjacent the outer face of one or both cooling plates 32, 32'. Thus, when an interposer 34 is provided for each battery assembly 12 and the battery assemblies 12-24 are held together in the stack, a resilient interposer 34 is disposed between adjacent battery assemblies. Thus, these interposers can be interleaved between adjacent battery assemblies so that the cooling plates can move in the longitudinal direction towards and away from the faces of the cell units. This motion may be resilient in the sense that the foam can accommodate some displacement e.g. due to expansion of the cell unit 30, but will hold the cooling plates 32, 32' in contact with the skin plates 31, 31' and move them back against the skin plates 31, 31' (to maintain thermal contact with the cell units) in the event that the cell unit 30 contracts again.

Counterintuitively, the use of slabs of material, which may be thermally insulating such as foam, between battery assemblies may improve thermal management. For example it may enable thermal contact to be maintained between the cooling plates and the cell units, even when the pouch cells expand and then contract again.

The battery 10 may comprise a holder 100, such as a rigid chassis to which the rods 50, 52 can be fixed for holding the pouch cell units 30, skin plates 31, 31', and cooling plates 32, 32' together in a stack. This rigid chassis may comprise a housing for encapsulating the battery.

One example of such a holder is illustrated in FIG. 1. As shown, the holder 10 comprises a base and four walls which provide an open cuboid enclosure (in the illustration the front wall is shown cutaway). Two opposite end walls 102, 104 of this enclosure 100 may be coupled to the rods 50, 52 which are threaded through the through holes 40, 42, 44, 60, 62, 64 in the battery assemblies 12-24. The stack of battery assemblies 12-24 can thus be held in the enclosure 100, in such a manner that the cells are laterally constrained but longitudinal expansion and contraction is possible. A spacer plate 106 may be provided at the end of the rods 50, 52, and may hold the last battery assembly in the stack spaced apart from the wall of the enclosure 100. This may further assist in accommodating longitudinal expansion and may provide additional "ruggedisation" (e.g. to protect the cell units from damage by mechanical force.

The battery assemblies 12-24 in the stack are arranged so that the exchange contact area 72 of each battery assembly faces the open side of the enclosure 100. A heat exchange panel (not shown in FIG. 1) may be secured to the holder to enclose the battery and provide thermal contact with the exchange contact areas 72.

A strip of foam (e.g. a polymeric foam, which may be open-celled foam) can be disposed in the space 80 between the exchange contact areas 72 of the cooling plates, and the top edge of the pouch cell units 30. This is one way to provide a resilient mounting which allows the cooling plates 32, 32' to move resiliently in the transverse direction (e.g. along the surface of the pouch cells). Thus, in response to the heat exchange panel being fixed to the holder 100 to enclose the pouch cell units 30, the heat exchange panel 32 and the exchange contact area of the cooling panel are urged against each other by compression of the resilient foam in this space 80. Of course, other arrangements may be used to provide this same transverse resilient movability of the cooling plates 32, 32'. In addition, it may also have advantages when the holder 100 is used in a situation in which it may move with respect to a heat exchange panel.

There are a variety of ways to provide improved thermal management of such battery assemblies. One possibility is (as best illustrated in FIG. 4) to provide a channel 200 in the cooling plate 32 in which a heat pipe 202 can be seated.

FIG. 4 shows an exploded view of a battery assembly 12. As shown the cooling plate 32 can include a lateral channel 200, which runs across one face of the cell contact area 70 of the cooling plate 32 toward the exchange contact area 72. The channel 200 may be provided by a rectangular groove in the surface of the cooling plate 32, and may be provided in the surface which is opposite to the skin plate 31. This can allow the resilient interposer 34, such as the foam slab to overly the channel, and provide thermal insulation from adjacent cell units in the stack. This may promote efficient heat conduction along the pipe 202 from the cell unit 30.

As shown, a heat pipe 202 can be fitted snugly into the channel. The heat pipe 202 may comprise a vapor chamber type heat pipe. Examples of suitable heat pipes include the MHP series of heat pipes available from Amec Thermasol (1-2 Steam Mill Lane, Great Yarmouth, Norfolk, NR31 0HP; www.amecthermasol.co.uk). The heat pipe 202 may comprise a cuboid chamber, and may be L-shaped, for example the cuboid may be bent so that one part of the heat pipe fills the channel 200 along the cell contact area 70 of the cooling plate 32, and another part of the heat pipe is longitudinally aligned for contact with the heat exchange panel described above. The heat exchange panels described herein may comprise a network of channels for carrying a coolant fluid. The channels may be recessed into the panel, or may be provided by a separate component carried on the panel.

FIG. 5 shows a further possible arrangement of a battery comprising a plurality of battery assemblies such as those described above with reference to FIG. 1, FIG. 2, FIG. 3, and FIG. 4.

FIG. 5 comprises two schematic cross-section views of the battery. As illustrated this battery comprises a set of battery assembly units 12, 14, 16, 18, 20, 22, 24 in a holder 500. The holder 500 comprises an enclosure 502 secured to a heat exchange panel 504.

Each unit of the battery assembly comprises a pouch cell 30, two cooling plates 32, 32', and two skin plates 31, 31'.

Each pouch cell 30 is a flat cuboid. The pouch 30 comprises two rectangular flexible laminar sheets or skins, sealed together along three edges, and having terminals sealingly secured at the fourth edge. These flexible skins allow expansion and contraction of the pouch as the temperature of the media in the cells (e.g. electrolyte and other components) varies in temperature due to the delivery of electrical power and other operational circumstances.

The pouch cells 30 are each sandwiched between two cooling plates 32, 32', adjacent the major surfaces of the pouch 30. On either side of the pouch cell 30, interposed between each cooling plate 32, 32' and the pouch cell, is a skin plate 31, 31'.

Each cooling plate 32, 32' comprises two flat areas—a cell contact area 70, and an exchange contact area 72. These two flat parts of the cooling plate 32, 32' are transverse to each other (e.g. perpendicular). The cell contact area 70 of the cooling plate 32 has a major surface which lies against the adjacent skin plate 31 for providing thermal contact with the pouch cell 30 via the skin plate 31.

In each unit 12-24 of the battery assembly the exchange contact areas 72 of the two cooling plates 32, 32' both lie along the same edge of the pouch cell 30. The exchange contact areas 72 of the cooling plates 32, 32' may comprise a set of tabs spaced apart along one edge of the cell contact area. These tabs may be arranged so that when the pouch cell is sandwiched between them, these tabs are interdigitated along the edge of the cell. The interdigitated arrangement of these tabs may enable the cooling plates to provide a combined exchange contact area which covers a substantial part of the edge of each pouch cell.

A securement bar 506 is provided along the edge of each pouch cell 30 interposed between the pouch cell 30 and interdigitated tabs which provide the combined exchange contact area 72, 72'. The ends 508, 510 of these bars 506 protrude beyond the ends of the exchange contact area 72 where they are secured to the heat exchange panel 504. Thus, each securement bar 506 holds the exchange contact areas 72 of a corresponding pair of cooling plates 32, 32' against the heat exchange panel 504 in thermal contact with the panel 504.

As illustrated in FIG. 5 one end of each securement bar 506 may be joined to a spine 512, which joins the securement bars 506 together in the form of a comb. The other end of each securement bar (a free end 510) may be held in place by being fitted into a restraint (such as a staple or loop) secured to the heat exchange panel. The free ends 510 of the securement bars 506 can simply be slotted into these restraints before the other ends 508 (which may be joined to the spine 512) is affixed to the heat exchange panel using fixtures 514 such as bolts or rivets, which may pass through the spine 512. The securement bars 506 can thus be affixed parallel to the heat exchange panel, with the exchange contact areas 72 of the cooling plates sandwiched between the securement bar and the heat exchange panel. As illustrated in FIG. 5, the securement bars and the spine may be provided by a comb shaped panel.

The battery assembly may comprise supporting feet 515, 517, which extend from the side of the assembly which is opposite the exchange contact areas for example the feet 515, 517 may protrude from an edge of the cell contact area of the cooling plates at ends of the stack of pouch cell assemblies, to provide one support foot at each corner of the stack. The internal surface of the enclosure 500 may comprise recesses 516, 618 sized and positioned so that these feet 515, 517 can fit into the recesses to support the stack and/or to constrain the lateral position of the stack in the enclosure.

As in the arrangements described above, a resilient interposer may be provided between adjacent units as explained above. The resilient interposer is arranged between two adjacent pouch cells to accommodate relative lateral thermal expansion and contraction of said two adjacent pouch cells whilst holding the corresponding cooling plates against their corresponding pouch cells. This can help to hold the cell contact area in thermal contact with the flexible surface of the first pouch cell in the event of expansion and/or contraction of the pouch cell.

The skin plates described above are optional, but where they are included they can help to ensure that the cell contact area can slide with respect to the skin of the pouch without tearing the skin and while maintaining thermal contact between the cell and the cooling plate. As noted above, the cooling plates may comprise a recess for holding a heat pipe, and a heat pipe may be disposed in said recess for carrying heat across the cell contact area to the exchange contact area.

It will be appreciated from the discussion above that the embodiments shown in the Figures are merely exemplary, and include features which may be generalised, removed or replaced as described herein and as set out in the claims.

As one example, each of the pouch cells are described as being rectangular, and may be made of two sheets bonded shut on three edges, with electric terminals, for connection to the anode and cathode at the fourth edge of the pouch cell, which is also sealed around these terminals. However, other shapes may be used for example the sheets need not be rectangular, and/or anode and cathode terminals need not be provided at the same edge of the pouch. The terminals of the pouch cell can be connected to terminals of the pouch cell unit, and such a unit may comprise any number of cells.

For example, if the pouch cell unit comprises more than one cell, these may be electrically connected together in any appropriate way to allow the unit to be electrically connected to other units to form a battery. In one example of such a unit, the unit comprises four cells. These may be arranged as two pairs, in which each pair is connected together in series, and the two pairs are connected together in parallel (or vice versa each pair comprising two cells in parallel and the two pairs connected in series).

As another example, the pouch cell units and skin plates are described as having four through holes, one at each corner. Whilst this configuration may have advantages, other arrangements can be used. For example, a greater or lesser number of through holes may be present.

As another example, to provide resilient mounting of the cooling plates, a strip of foam between the pouch cell unit and the exchange contact area is just one option. Any other resilient mounting between the cooling plate and the colder may also be used, provided that it permits lateral (e.g. transverse) movement of the cooling plates. The resilience of such a mounting typically provides a bias, which urges the cooling plate against the heat exchange panel. This assists thermal contact between the exchange contact area and the heat exchange panel. Such a resilient mounting may be provided by any other appropriate means, for example it can be provided by a resilient fitting between the rod(s) and the cooling plate at the through hole in the cooling plate (e.g. the plate may be held on a resilient grommet, disposed in the through hole in the cooling plate). As a further example, the cooling pates may be seated on a resilient member, e.g. at the opposite side of the cooling plate from the exchange contact area.

As a further example, the possibility of using heat pipes in the cooling plates has been discussed. These are clearly optional. However it may be advantageous to provide slots in the cooling plates, and thermally conductive inserts fitted into those slots, e.g. the insert may fill the slot and provide good thermal contact between the insert and the rest of the plate. This can allow the batteries of the present disclosure to be adapted after manufacture by the simple removal of these inserts and their replacement by a heat pipe or other adaptation. The insert may comprise an L-shaped piece of thermally conductive material such as a metal. One part of this insert slots into the channel in the cooling plate while the other provides a longitudinally arranged surface for thermal contact with a heat exchange panel which can be fixed to the enclosure of the battery as described above.

The arrangements described herein may provide the advantage of improved thermal management without the need for liquid coolant in the battery enclosure. The heat exchange panel may be arranged for fixing to the enclosure to provide a waterproof enclosure. The enclosure may be IP67 rated.

The heat pipe described above is described as a vapour chamber, which may be made from a metal such as aluminium. Any appropriate vapour chamber heat pipe may be used. For example the heat pipe may comprise a chamber of a volatile solvent such as acetone, however any appropriate type of heat pipe may be used. Examples of such heat pipes include:
- Variable Conductance Heat Pipes (VCHPs), e.g. such as those which use a Non-Condensable Gas (NCG) to change the heat pipe effective thermal conductivity as power or the heat sink conditions change
- Pressure Controlled Heat Pipes (PCHPs) e.g. such as those which are a VCHP where the volume of the reservoir, or the NCG mass can be changed, to give more precise temperature control
- Diode Heat Pipes, e.g. such as those which have a high thermal conductivity in the forward direction, and a low thermal conductivity in the reverse direction
- Thermosyphons, e.g. such as those where the liquid is returned to the evaporator by gravitational/accelerational forces,
- Rotating heat pipes, e.g. such as those where the liquid is returned to the evaporator by centrifugal forces With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A battery assembly comprising:
   a first pouch cell for a battery, comprising a flexible surface to allow expansion and contraction of the first pouch cell
   a cooling plate having:
      a cell contact area for providing thermal contact between the cooling plate and the flexible surface of the first pouch cell; and
      an exchange contact area for providing thermal contact with a heat exchanger;
   a resilient interposer arranged to hold the cell contact area in thermal contact with the flexible surface of the first pouch cell in the event of expansion and/or contraction of the first pouch cell; and
   a first skin plate between the cell contact area and the flexible surface of the first pouch cell, wherein the first skin plate is thermally conductive.

2. A battery assembly comprising:
   a first pouch cell for a battery, comprising a flexible surface to allow expansion and contraction of the first pouch cell
   a cooling plate having:
      a cell contact area for providing thermal contact between the cooling plate and the flexible surface of the first pouch cell; and
      an exchange contact area for providing thermal contact with a heat exchanger;
   a resilient interposer arranged to hold the cell contact area in thermal contact with the flexible surface of the first pouch cell in the event of expansion and/or contraction of a first pouch cell; and
   wherein the resilient interposer is arranged to bias the cell contact area against the first skin plate.

3. A battery assembly comprising:
   a plurality of pouch cells, each comprising a flexible surface to allow expansion and contraction of the pouch cells;
   a heat exchange panel, for securing to a holder to enclose the battery assembly;
   a plurality of cooling plates each having:
      a cell contact area for providing thermal contact with the flexible surface; and
      an exchange contact area transverse to the cell contact area and configured for providing thermal contact with the heat exchange panel;

wherein each cooling plate is arranged so its cell contact area is in thermal contact with the flexible surface of a respective corresponding one of the plurality of pouch cells;

the battery assembly further comprising
a plurality of securement bars, each bar holding the exchange contact area of a corresponding one of the plurality of cooling plates to the heat exchange panel;
wherein the heat exchange panel provides a lid of the holder and the lid and the securement bars together hold the battery assembly suspended in the holder.

* * * * *